United States Patent [19]

Glass et al.

[11] Patent Number: 5,661,665
[45] Date of Patent: Aug. 26, 1997

[54] MULTI-MEDIA SYNCHRONIZATION

[75] Inventors: Adam Glass, Kirkland; Craig Dowell, Redmond; James L. Green, North Bend; George Shaw, Woodinville, all of Wash.

[73] Assignee: Microsoft Corporation, Redmond, Wash.

[21] Appl. No.: 669,719

[22] Filed: Jun. 26, 1996

[51] Int. Cl.$^6$ .................................................. H04N 9/79
[52] U.S. Cl. ............................................. 348/423; 348/390
[58] Field of Search ........................... 364/514 R, 514 A; 348/390, 17, 423, 512, 518, 500; 358/318, 341

[56] References Cited

U.S. PATENT DOCUMENTS

| 5,420,801 | 5/1995 | Dockter et al. | 364/514 R |
| 5,452,006 | 9/1995 | Auld | 348/390 |
| 5,463,565 | 10/1995 | Cookson et al. | 364/514 R |

OTHER PUBLICATIONS

Gibbs, Simon, "Application Construction and Component Design in an Object-Oriented Multimedia Framework," (1992) (Nov.) pp. 394–300.

Gibbs et al., "An object-Oriented Framework for Multimedia Composition and Synchronisation," *Multimedia–Principles, Systems and Applications*, Chapter 8 (1991), (no month) pp. 101–111.

Gibbs, Simon, "Composite Multimedia and Active Objects," ACM (1991) (no month) pp. 97–112.

de Mey et al., "A Multimedia Kit–Experiences With Visual Composition of Application," (1993) (no month) pp. 291–300.

*Primary Examiner*—Emanuel T. Voeltz
*Assistant Examiner*—Thomas Peeso
*Attorney, Agent, or Firm*—Lee & Hayes, PLLC

[57] ABSTRACT

A method is described for synchronously rendering digitized media streams. Each digitized media stream is made up of a sequence of media samples having media-specified timing. The described method includes calculating presentation times for media samples of different media streams based in part on the media-specified timing of the media samples and also based in part upon the desired synchronization of the different media streams relative to each other. The calculated presentation times indicate when the media samples should be rendered relative to a common clock reference. The method further includes attaching a media sample's calculated presentation time to the media sample, and then routing the media sample to a sink component for rendering. The sink component renders the respective media samples of the digitized media streams at the approximate presentation times of the samples relative to the common clock reference.

27 Claims, 3 Drawing Sheets

MULTI-MEDIA SYNCHRONIZATION

TECHNICAL FIELD

This invention relates to synchronizing media streams in systems having sets of interconnected processing components through which media samples of the media streams are routed.

BACKGROUND OF THE INVENTION

There are many different types of systems in which signals or data are passed in a directed flow from source components (where the signals or data originate or enter the system), through transfer components (which may modify the signals or data), to sink components (where the signals or data terminate or exit the system). A multimedia computer is an example of such a system. In a multimedia computer, audio and video data might originate from a mass storage system, pass through decompression components (implemented in hardware or software), and be supplied to a speaker and a display device.

The invention described below will be used in a computer system for retrieving media streams of different types and for processing and rendering such media streams on appropriate output devices. A media stream is represented by a sequence of samples or digital sample values. For instance, an audio media stream is represented by a series of digital values, each indicating the instantaneous intensity of the desired audio signal at a particular point in time.

The computer system is configured to include a plurality of processing components implemented in software, including source, transfer, and sink processing components. Each processing component might be associated with one or more hardware devices and associated device driver programs. The invention can also be used in other contexts, such as in systems that implement the various components in hardware or firmware.

FIG. 1 shows an example of an interconnected system of processing components in accordance with the prior art. Functionally, the system retrieves a compressed stream of sampled data representing a video segment from a mass storage device 12, decompresses the data, and displays it on a display device 13. In addition to the two physical devices (mass storage device 12 and display device 13), the system includes a source processing component 14, a transfer or intermediate processing component 15, and a sink processing component 16. Source processing component 14 is associated with a device driver 17, in this case a hard disk driver, that handles details of communications with mass storage device 12. Source processing component 14 retrieves data from hard disk 12 at appropriate intervals and prepares or formats the data for subsequent handling by transfer component 15. Transfer component 15 is associated with decompression software 18 for decompressing data into a format suitable for handling by video display hardware. The decompressed data is received by sink component 16, which is associated with a video display driver 19 for transferring the decompressed data to a video display card and associated display device 13.

In many multimedia applications, there are multiple media streams that must be presented together. Inter-stream synchronization is required if particular media samples from different media streams must be rendered simultaneously. One example of this is where separate audio and video streams are to be rendered together. In this case, the audio must be fairly closely synchronized to the video. Another example is that of multiple graphic sprites; it is often desired for such independent sprites to maintain a time-based relationship between each other so that they appear to interact.

Intra-stream synchronization is required if one media stream must be initiated immediately after a previous media stream. This type of synchronization is performed relative to media streams rather than to the individual samples of media streams. Intra-stream synchronization is needed when the transition from one media stream to another must appear or sound seamless to a viewer or listener.

In a multi-component system such as described above with reference to FIG. 1, each media stream will typically be processed by its own set of processing components. This can make synchronization difficult. Theoretically, inter-stream synchronization can be achieved by beginning the rendering of each stream at the same time and rendering subsequent samples at appropriate and constant rates. However, timing within the various sets of processing components is typically not accurate enough for this type of synchronization to work well, resulting in an amount of drift or skew that is often noticeable. One prior art way to correct for such drift is to re-synchronize the media streams every so often. However, this method is somewhat disconcerting for a viewer, who sees or hears a noticeable "jump" in the media presentation whenever the re-synchronization occurs.

Another synchronization challenge results from the fact that the various processing components each have their own propagation delays. To make things worse, these propagation delays are sometimes variable with time. Because of such propagation delays, simultaneously beginning the rendering process for two different media streams does not necessarily mean that the actual rendering will begin simultaneously. One way to handle this is to calculate or estimate the propagation delays in advance, and to begin the rendering process for two different media streams at different times to account for the difference in propagation delays. This technique depends, however, on the accuracy with which the propagation delays can be predicted. It is not always possible to accurately predict such propagation delays.

SUMMARY OF THE INVENTION

The invention described below provides a way to synchronize different media streams in systems where the individual media stream samples are routed through different sets of processing components. The samples of each media stream are routed from a source component, through optional transfer components, and eventually to a sink or rendering component that actually render the samples. A presentation time is calculated and attached to each media sample as it is read or received. The presentation time indicates when the media sample is to be rendered in terms of a clock reference that is used by all rendering filters in the system. To start a media stream, an application program specifies its start time—also in terms of the reference clock. The first sample of the media stream is then assigned a presentation time equal to the start time. When the sample reaches the sink component, the sink component refers to the clock reference and waits until the specified presentation time to actually render the sample. To start two media streams simultaneously, the application program specifies identical start times for both of them. Synchronization is achieved because the start times are effected by the rendering components themselves. Relative drift between the media streams is avoided because all rendering components use the same time base.

To start one media stream immediately after another media stream, a stop time is specified for the first stream.

The system accepts samples for the first media stream only until reaching a sample that will have a calculated presentation time equal to the specified stop time. For the second media stream, a start time is specified that is equal to the stop time of the previous stream.

DETAILED DESCRIPTION OF THE PREFERRED EMBODIMENT

Figure 1:
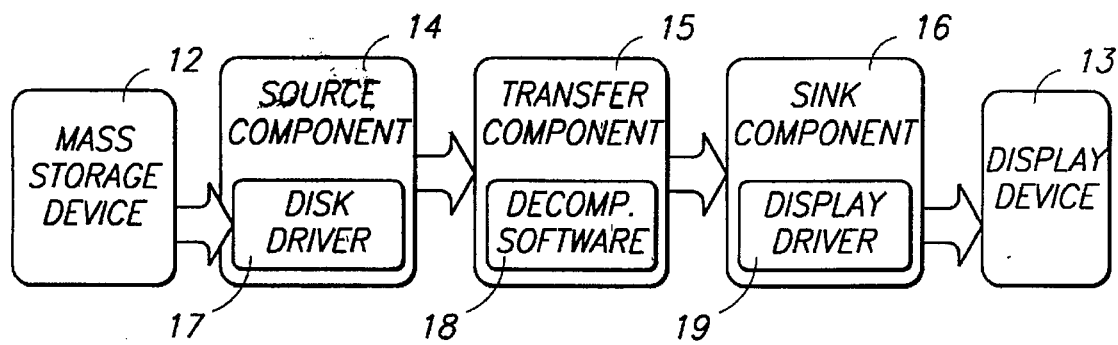
FIG. 1 is a block diagram of an interconnected system of media processing components for rendering a video stream in accordance with the prior art.
Figure 2:
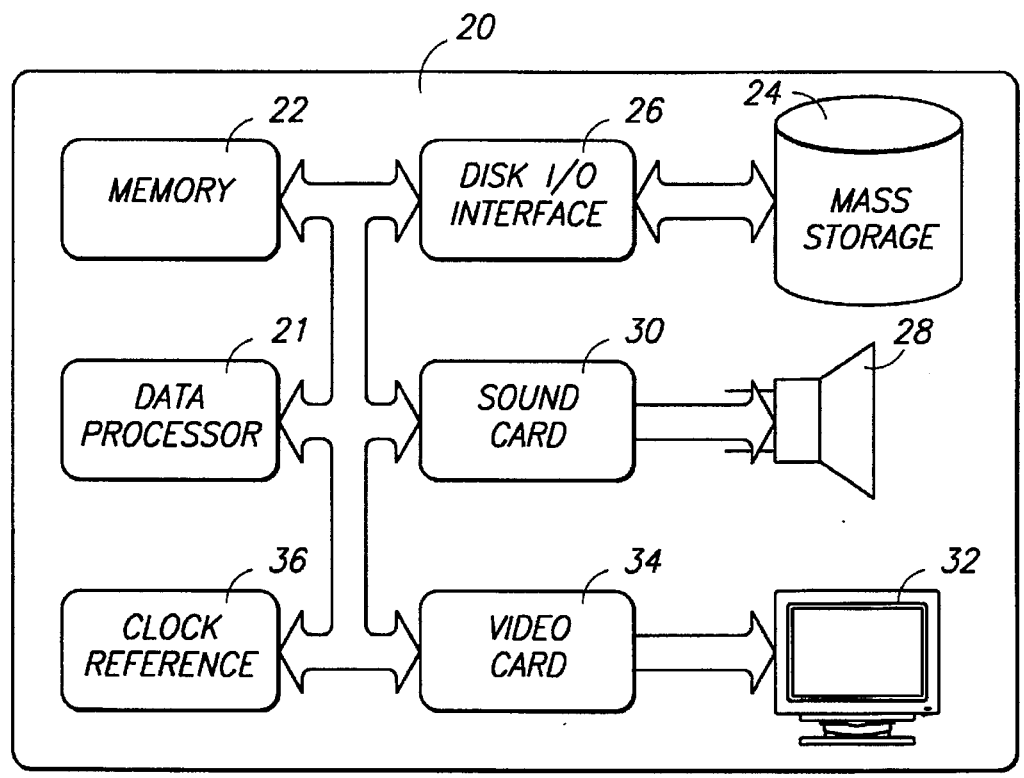
FIG. 2 is a block diagram of a media rendering system in accordance with a preferred embodiment of the invention.

FIG. 2 shows a computer system or media rendering system 20 in accordance with a preferred embodiment of the invention. Media rendering system 20 preferably comprises a desktop, laptop, or other personal computer having conventional components such as a data processor; various types of electronic, magnetic, and optical-based memory; I/O components such as a keyboard, printer, video display; and other optional multi-media components such as microphones and audio speakers. Alternatively, system 20 might in some cases comprise a simpler computer device such as a television set-top box or even a home entertainment system like a stereo system.

FIG. 2 shows computer hardware features most pertinent to the invention. These features include a data processor 21 and associated electronic memory 22. Memory 22 typically comprises DRAM (dynamic random access memory) or other volatile, electronic, high-speed memory, as well as non-volatile ROM (read only memory). Media rendering system 20 further includes a mass-storage device 24 such as a magnetic-based hard disk or optical-based CD-ROM. Application programs are typically stored on mass-storage device 24 and loaded into electronic memory 22 for execution by data processor 21. Disk I/O interface circuitry 26 is typically used to implement communications between data processor 21 and mass-storage device 24.

In this case, mass-storage device 24 also functions as a source of media streams. Such media streams, each comprising a sequence of individual media samples, are stored on mass-storage device 24 in the form of data files that can be retrieved sequentially, sample by sample. Such media streams can be in variety of different physical or logical formats, representing audio, video, and other types of presentation media. Media streams might also be available from different media sources, such as remote databases, online services accessed by modem, and network sources including the Internet.

It should be noted that, while the invention is described in the context of digital data streams, it is not limited to such. The invention will be useful in conjunction with different types of data streams as long as particular instants in the stream can be associated with time-values and adjustments can be made to arrange these instants with to coincide with a time source.

Media rendering system 20 includes hardware components for rendering different types of media streams. In the embodiment shown, these components include an audio speaker 28 and associated sound driver card 30. The sound driver card provides an interface from data processor 21 to audio speaker 28. Media rendering components in the illustrated embodiment also include a video display device such as a color CRT 32, and an associated video driver card 34 providing an interface to CRT 32 from data processor 21.

Media rendering system 20 also includes a clock reference 36 that is accessible by data processor 21. The use of clock reference 36 will be described in more detail below. The clock reference produces a monotonically increasing clock value. It might be derived from or supplied by one of a number of hardware or software timing sources, such as the system clock of the computer system.

Figure 3:
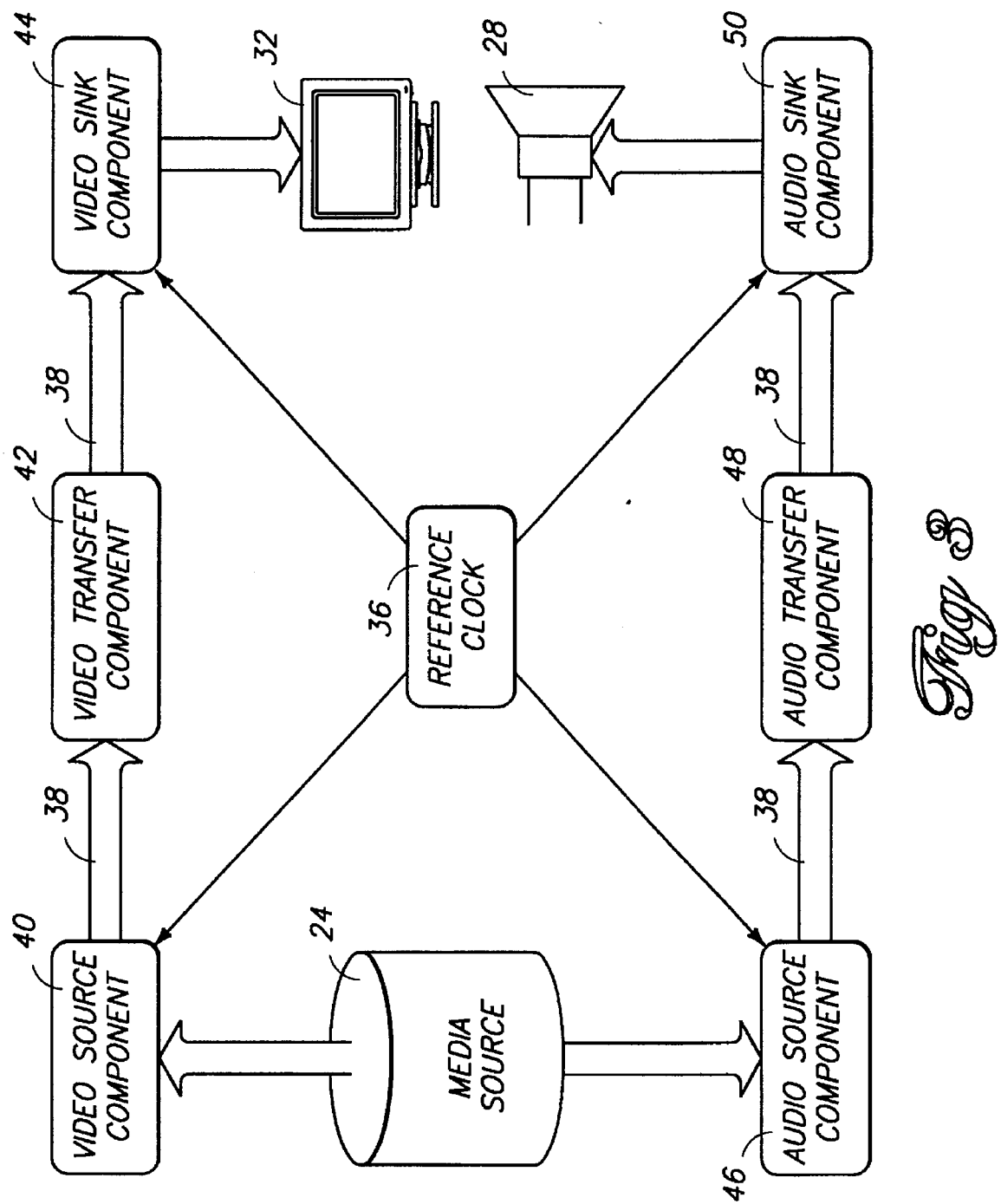
FIG. 3 is a data flow diagram of a media rendering system in accordance with a preferred embodiment of the invention.

A plurality of media processing components are implemented by program modules that execute on data processor 21 from memory 22. FIG. 3 shows these components in block form, also indicating the flow of media streams from their source to the physical device on which they are eventually rendered. The embodiment shown includes two sets of processing components: one for a digital video stream and one for a digital audio stream.

In the embodiment shown, the media streams are obtained from a common media source, in this case mass-storage device 24. For both the video stream and the audio stream, a source processing component reads media samples from media source 24. The implementation includes component interconnections 38 between the media processing Components that route the media samples, individually and in order, from the source processing component, through one or more transfer components, to a sink component. In the preferred embodiment, these are logical interconnections formed by software interfaces. The sink component renders the media samples on the appropriate output device.

In this case, a video source component 40 reads video samples, in compressed form, from media source 24 and routes them to a video transfer component 42. The video transfer component performs a decompression step and routes the decompressed video samples to a video sink component 44 for rendering on display device 32. An audio source component 46 reads compressed audio samples from media source 24 and routes them to an audio transfer component 48 for decompression. The decompressed audio samples are then routed to audio sink component 50 for actual rendering on audio speaker 28.

The media streams are stored in a pre-defined and conventional format in which timing is either implicitly or explicitly specified. For example, it might be implicit that sequential samples are to be rendered at a particular fixed rate. Alternatively, a particular format may include an explicit timing specification for each sample, indicating the relative time at which it is to be rendered. Such timing, which is specific and possibly unique to a particular media stream type, will be referred to herein as media-specified timing.

The various components are implemented as software modules or objects, having specified interfaces implemented in accordance with the OLE 2.0 component object model. Refer to Brockschmidt, Kraig: *Inside OLE* 2, Microsoft Press, Redmond, Wash., 1994, for a description of OLE 2.0. Through such interfaces, application programs can configure and interact with the processing components, and the components can interact with each other. Application programs can specify particular media streams to be rendered and when such renderings should be started. To render two media streams simultaneously, an application program specifies appropriate, often identical, start times for the media streams. In the preferred embodiment of the invention, start times are specified relative to reference clock 36.

Figure 4:
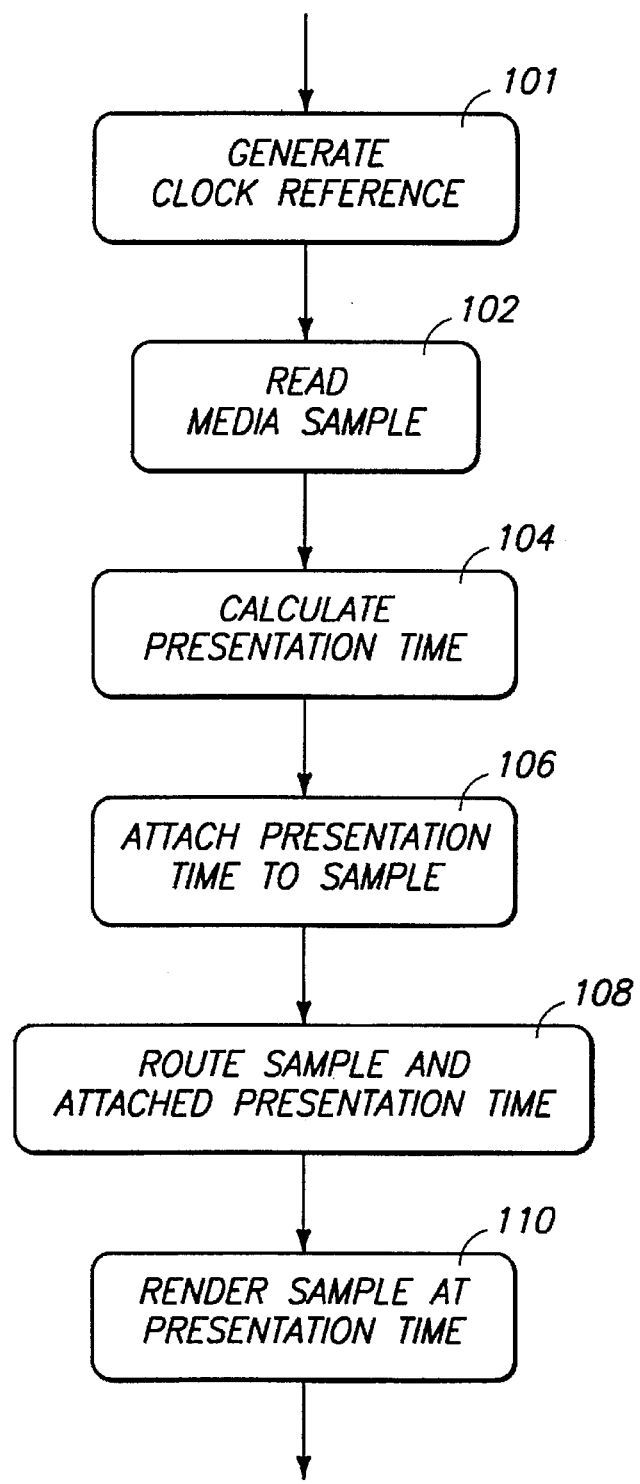
FIG. 4 is a flowchart showing preferred steps in accordance with the invention.

FIG. 4 illustrates steps in a preferred method of rendering a digitized media stream in such a way that a plurality of media streams can be rendered or presented in a desired synchronization. These steps are performed by the processing components of FIG. 3, and will be explained with reference to a video stream that is processed by video processing components 40, 42, and 44 of FIG. 3. It is assumed that these components have been configured by an application program to render a specified video stream.

A first step 101 comprises generating a common clock reference. This clock reference is generated in the embodiment of FIG. 3 by reference clock 36. The clock reference should consist of a monotonically increasing value. It is used as a reference for the timing of all media sample renderings. In addition, start times are specified in terms of the common clock reference. The clock reference is conveniently derived from a computer's time-of-day clock. However, other sources are available, such as the oscillator of a sound card.

A following step 102 comprises reading a media sample from media source 24. This step is performed by video source component 40. A subsequent step 104 comprises calculating a presentation time for the media sample. The presentation time indicates when the media sample should eventually be rendered by video sink component 44, and is specified relative to clock reference 36. This calculation is based in part on the media-specified timing of the media sample and also upon the media stream start time specified by the application program that requested the rendering of the media stream. Typically, a presentation time will be equal to the specified start time plus an offset derived from the media-specified timing of the particular media sample. Alternatively stated, this step comprises mapping or translating the media-specified timing of the media sample to a presentation time that is specified in terms of a clock reference. The clock reference is used in common by all media processing components in the system, or at least by those that need to be synchronized. To minimize the amount of precision lost in this mapping, the clock reference should be chosen to have a relatively high resolution.

Step 106 comprises associating the calculated presentation time with the media sample. More specifically, this step is performed by video source component 40 by attaching the calculated presentation time to the associated media sample before the media sample is routed to sink component 44. The presentation time is thus passed from one processing component to the next with its associated media sample.

A further step 108 comprises routing the media sample and its associated presentation time through a possible plurality of transfer processing components, such as video transfer component 42, to video sink component 44.

Step 110, performed by sink component 44, comprises rendering the media sample at an approximate time relative to the common clock reference, as indicated by the presentation time associated with and attached to the media sample. The media sample is not necessarily rendered immediately. Rather, the sink component waits until the specified presentation time before rendering the sample.

The steps of FIG. 4 are repeated for each media sample of the specified media stream.

As a practical matter, it should be noted that each of the processing components has an associated propagation delay. Because of this, the presentation time for any particular media sample needs to be calculated to lag its read time (the time at which is was read by the source processing component) by at least the sum of the propagation delays of the processing components through which the media sample is to be routed. More simply stated, the source component needs to read the samples somewhat in advance of their actual presentation times so that the samples will arrive at the sink component on time.

The components and methodical steps of FIGS. 3 and 4 are used in the preferred embodiment of the invention to render two or more media streams with inter-stream or intra-stream synchronization. For inter-stream synchronization, it is desired to render the media streams, such as a video stream and an audio stream, simultaneously. In this case, an application program performs a step of sending a play command to a first source processing component such as video source component 40. The application sends a similar play command to a second processing component such as audio source component 46. Each play command identifies the media stream to be read from media source 24 and the desired start time of the media stream in terms of clock reference 36. Most likely, each play command will specify an identical start time, so that the two media streams will begin at the same time. It may be desirable in some cases to specify different start times to achieve the desired synchronization. The two play commands do not have to be issued simultaneously in order to simultaneously to start the renderings of the two media streams.

The respective source processing components accept the play commands and begin reading the media samples of the media streams in accordance with step 102 of FIG. 4, making sure that each sample is read enough earlier than its presentation time to account for the propagation delays of the various components through which it will be routed. As already discussed, the source processing components calculate presentation times for the media samples of the different media streams, based in part on the media-specified timing of the samples and also upon the desired synchronization of the different media streams relative to each other (as indicated by the start times). The presentation times are calculated to begin rendering each media stream at its approximate start time relative to the clock reference. In other words, the first media sample is associated with a presentation time that is equal to its start time, in terms of the clock reference.

The media samples and their associated presentation times are routed individually through the various transfer components to the respective sink components, where they are rendered at approximately their specified presentation times. Because the first sample of each stream has a presentation time equal to the specified start time of the stream, the sink processing components will begin rendering the streams at the start times.

Since the start times are specified with respect to the clock reference, and since both of the sink components time their renderings with reference to the clock reference, the two media streams will be initiated at the correct times relative to each other, regardless of propagation delays through the various processing components. Similarly, relative drift between the renderings of the two media streams will be avoided or eliminated through the use of a common clock reference and by the practice of referring to the clock reference from the rendering processing components.

Intra-stream synchronization can also be easily performed, so that a first media stream is followed immediately and seamlessly upon its conclusion by a second media stream. To achieve intra-stream synchronization of first and second media streams, a play command is sent to a source processing component to render the first media stream. In this case, the play command identifies the media stream and specifies both a start time and a stop time. Again, the start and stop times are specified in terms of the common clock reference. The source component begins reading the media stream and routing samples to the sink component, along with calculated presentation times, in accordance with the steps of FIG. 4. In this case, however, the source component stops reading and routing media samples upon calculating presentation times that are greater than the specified stop time. As a result, rendering of the media stream stops at approximately the stop time. Sometime before the stop time, the application program sends another play command, either to the same source component or to another source component, containing instructions for initiating the second media stream. This play command identifies the second media stream, and specifies a start time having a desired relationship to the stop time specified in the previous play command. For seamless transition from one stream to the next, this start time is equal to or just slightly greater than the stop time specified for the first media stream. As the second media stream is rendered, its presentation times are modified to account for its delayed start time relative to the first media stream.

A potential problem that must be handled by the rendering component is that of media samples that arrive too late or too fast to be rendered on the specified time. When samples arrive too late, it may be desirable to simply discard them. In other cases, it may be desirable to render them as they arrive, even though this might result in a loss of synchronization. When samples arrive at a rate that is higher than the capabilities of the rendering device, some form of graceful degradation can often be achieved by discarding certain samples.

Clock reference 36 is described above as a free-running clock independent of any particular media rendering hardware. In some cases, however, one or more rendering devices might have their own hardware clocks. It is desirable to use components having hardware clocks that can be synchronized to the free-running clock reference. However, in some cases it might be difficult to synchronize these hardware clocks with the, free-running clock reference. In such systems, one possibility is to use the hardware clock of the rendering device as the clock reference. Another possibility is to use a clock that is not free-running, derived from one of the media streams that is being rendered. When utilizing this last method, a reference media stream is rendered at its default rate, and the reference clock is calculated from the time base of the reference media stream. More specifically, a reference clock value is calculated for every sample of the reference media stream, based in the time base of the reference media stream. Other media streams are then synchronized to this derived reference clock as described above.

Calculating the clock reference from a reference media stream has the advantage that the speed of rendering can be varied without requiring a recalculation of presentation times for the samples of the various media streams. Since the reference clock is based in the reference media stream, simply varying its rate of rendering will also vary the reference clock and thus the rendering rate of all other media streams. Rendering can even be reversed without requiring recalculation of presentation times.

An optional feature of the invention is the ability to arbitrarily modify calculated presentation times to produce various effects as a media stream moves through components of the system. The simplest modification is to modify presentation times to slow down or accelerate media playback. Other, more complex modifications might be possible to produce other effects. Rather than modifying individual presentation times, the system might allow general modifications to the rendering speed of individual media streams. For instance, an application program could specify that a particular media stream is to be rendered at double speed.

Another optional feature is the use of end-of-stream tags to allow periods of "silence" or inactivity in a media stream. For instance, an audio stream might have long periods of silence. Rather than retrieving continuous data during these periods, the media stream could have end-of-stream tags specifying certain periods of silence, during which the system would not attempt to retrieve data. This technique allows silence compression for low-bandwidth connections, motion video transitioning into a slide show presentation, etc.

The system and methods described above remedy the prior art problems relating to media stream synchronization. Each media sample is "time-stamped" to indicate its desired presentation time with reference to a common or universal clock reference. It is the responsibility of the rendering component to render the individual media samples at the specified times. This ensures that media streams can be started simultaneously and that they can be rendered synchronously, without time-based drifting relative to each other.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A method of synchronously rendering a plurality of media streams, each media stream comprising a sequence of media samples having media-specified timing, the method comprising the following steps:

generating a common clock reference;

calculating presentation times for the media samples based in part on the media-specified timing of the media samples and also based in part upon a desired synchronization of the media streams relative to each other;

associating the presentation times with the media samples of the plurality of media streams, each presentation time indicating when the associated media sample should be rendered relative to the common clock reference;

rendering the respective media samples of the plurality of media streams at approximate times relative to the common clock reference as indicated by the presentation times associated with the respective media samples.

2. A method as recited in claim 1, further comprising:

calculating the presentation times based upon the desired synchronization of the media streams relative to each other.

3. A method as recited in claim 1, further comprising:

calculating the common clock reference based on a reference media stream.

4. A method as recited in claim 1, further comprising:

varying the common clock reference to vary the rendering rate of the media samples.

5. A method as recited in claim 1, further comprising:
calculating the common clock reference based on a reference media stream;
varying the common clock reference to vary the rendering rate of the media samples.

6. A method as recited in claim 1, further comprising a step of embedding end-of-stream tags in at least one of the media streams to indicate periods of media inactivity.

7. A method as recited in claim 1, further comprising:
attaching the presentation times to their associated media samples; and
routing the media samples of the media streams and the attached presentation times through a plurality of processing components, wherein at least one of the processing components performs the step of rendering the media samples of a particular media stream.

8. A method as recited in claim 1, further comprising:
attaching the presentation times to their associated media samples;
routing the media samples of the media streams and the attached presentation times through a plurality of processing components, the processing components having propagation delays, wherein at least one of the processing components performs the step of rendering the media samples of a particular media stream;
reading the media samples from one or more media sources at respective read times, the presentation times lagging the read times by at least the sum of the propagation delays of the processing components through which the media samples are routed.

9. A method of synchronously rendering a plurality of media streams, each media stream comprising a sequence of media samples having media-specified timing, the method comprising the following steps:
generating a common clock reference;
calculating presentation times for media samples of different media streams based in part on the media-specified timing of the media samples and also based in part upon the desired synchronization of the different media streams relative to each other, said presentation times indicating when the media samples should be rendered relative to the common clock reference;
routing the samples of any particular media stream to a sink processing component that renders the media samples of the particular media stream;
attaching a particular media sample's calculated presentation time to the particular media sample before the particular media sample is routed to the sink component;
the sink component rendering the respective media samples of the plurality of media streams at approximate times relative to the common clock reference as indicated by the presentation times attached to the respective media samples.

10. A method as recited in claim 9, further comprising:
reading the media samples with one or more source processing components from one or more media sources at respective read times;
routing the samples of any particular media stream through at least one processing component to the sink component;
the processing components through which the media samples are routed having propagation delays;
the presentation times for any particular media sample being calculated to lag its read time by at least the sum of the propagation delays of the processing components through which the media sample is routed.

11. A method as recited in claim 9, further comprising:
sending a play command to a source processing component that reads media samples of a particular media stream from a media source, the play command specifying a start time for the particular media stream relative to the common reference clock;
calculating the presentation times of the particular media stream's samples relative to the specified start time to begin rendering the particular media stream approximately at the start time relative to the common reference clock.

12. A method as recited in claim 9, further comprising:
sending a play command to a source processing component that reads media samples of a particular media stream from a media source, the play command specifying a start time and a stop time for the particular media stream relative to the common reference clock;
calculating the presentation times of the particular media stream's samples relative to the specified start time to begin rendering the particular media stream approximately at the start time relative to the common reference clock;
stopping the routing of media samples upon calculating a presentation time that is greater than the specified stop time.

13. A method as recited in claim 9, further comprising:
reading media samples with a source processing component from the media source;
the source processing component performing the step of attaching the presentation times to the media samples.

14. A method of rendering a media stream, comprising the following steps:
generating a clock reference;
sending a play command to a source processing component that reads media samples of a media stream from a media source;
specifying a start time for the media stream in the play command, the start time being specified relative to the clock reference;
routing the media samples of the media stream from the source processing component to a sink processing component;
the sink processing component beginning the rendering of the media stream at approximately the start time relative to the reference clock.

15. A method as recited in claim 14, further comprising:
specifying a stop time for the media stream in the play command, the stop time being specified relative to the clock reference;
stopping the rendering of the media stream at approximately the stop time relative to the reference clock.

16. A method as recited in claim 14, further comprising:
calculating presentation times for the respective media samples of the media stream relative to the clock reference;
the source processing component attaching the presentation times to the respective media samples for routing to the sink processing component;
the sink processing component rendering the media samples at approximate times relative to the clock reference as indicated by the presentation times attached to the media samples.

17. A method as recited in claim 14, further comprising:

calculating presentation times for the respective media samples of the media stream relative to the clock reference, based upon the specified start time;

the source processing component attaching the presentation times to the respective media samples for routing to the sink processing component;

the sink processing component rendering the media samples at approximate times relative to the clock reference as indicated by the presentation times attached to the media samples.

18. A method of synchronizing two media streams, comprising the following steps:

generating a common clock reference;

sending first and second play commands to one or more source processing components that read media samples of first and second media streams from one or more media sources;

specifying a stop time for the first media stream in the first play command, the stop time being specified relative to the common clock reference;

specifying a start time for the second media stream in the second play command, the start time being specified relative to the common clock reference;

routing the media samples of the first and second media streams from the source processing components to one or more sink processing components;

the one or more sink processing components rendering the media streams;

the one or more sink processing components stopping the rendering of the first media stream at approximately the stop time relative to the common reference clock;

the one or more sink processing components beginning the rendering of the second media stream at approximately the start time relative to the common reference clock.

19. A method as recited in claim 18, further comprising:

calculating presentation times for the respective media samples of the first and second media streams relative to the common clock reference;

the one or more source processing components attaching the presentation times to the respective media samples for routing to the one or more sink processing components;

the one or more sink processing components rendering the respective media samples at approximate times relative to the common clock reference as indicated by the presentation times attached to the respective media samples.

20. A method as recited in claim 18, further comprising:

calculating presentation times for the respective media samples of the second media stream relative to the common clock reference, based upon the specified start time;

the one or more source processing components attaching the presentation times to the respective media samples for routing to the one or more sink processing components;

the one or more sink processing components rendering the respective media samples at approximate times relative to the common clock reference as indicated by the presentation times attached to the respective media samples.

21. A method as recited in claim 18, further comprising:

specifying a start time for the first media stream in the first play command, the start time for the first media stream being specified relative to the common clock reference;

calculating presentation times for the respective media samples of the first and second media streams relative to the common clock reference, based upon the specified start times;

the one or more source processing components attaching the presentation times to the respective media samples for routing to the one or more sink processing components;

the one or more sink processing components rendering the respective media samples at approximate times relative to the common clock reference as indicated by the presentation times attached to the respective media samples.

22. A media rendering system comprising:

a media source;

a timing source that supplies a clock reference;

a plurality of media processing components including a source component and a sink component;

the source component reading media samples of a media stream from the media source;

component interconnections between the media processing components to route the media samples from the source component to the sink component;

the source component attaching presentation times to the respective media samples indicating when the respective media samples should be rendered relative to the clock reference;

the sink component rendering the respective media samples at approximate times relative to the clock reference as indicated by the presentation times attached to the respective media samples.

23. A media rendering system as recited in claim 22, wherein:

the source component accepts a play command specifying a start time for the media stream relative to the clock reference;

the source component calculates the presentation times relative to the specified start time to begin rendering the media stream approximately at the start time relative to the clock reference.

24. A media rendering system as recited in claim 22, wherein:

the source component accepts a play command specifying a start time and a stop time for the media stream relative to the clock reference;

the source component calculates the presentation times relative to the specified start time to begin rendering the media stream approximately at the start time relative to the clock reference;

the source component stops reading media samples from the media source when the presentation times of such media samples are greater than the specified stop time.

25. A method of synchronously rendering a plurality of media streams, each media stream comprising a sequence of media samples, the method comprising the following steps:

generating a common clock reference;

associating presentation times with the media samples of the plurality of media streams, each presentation time indicating when the associated media sample should be rendered relative to the common clock reference;

rendering the respective media samples of the plurality of media streams at approximate times relative to the common clock reference as indicated by the presentation times associated with the respective media samples:

varying the common clock reference to vary the rendering rate of the media samples.

26. A method of synchronously rendering a plurality of media streams, each media stream comprising a sequence of media samples, the method comprising the following steps:

calculating a common clock reference based on a reference media stream;

associating presentation times with the media samples of the plurality of media streams, each presentation time indicating when the associated media sample should be rendered relative to the common clock reference;

rendering the respective media samples of the plurality of media streams at approximate times relative to the common clock reference as indicated by the presentation times associated with the respective media samples.

27. A method as recited in claim 26, further comprising:

varying the common clock reference to vary the rendering rate of the media samples.

* * * * *